US012655661B2

(12) United States Patent
Morey et al.

(10) Patent No.: US 12,655,661 B2
(45) Date of Patent: Jun. 16, 2026

(54) VEHICULAR DOOR HANDLE ASSEMBLY

(71) Applicant: Magna Mirrors of America, Inc.,
Holland, MI (US)

(72) Inventors: Rudy A. Morey, Hudsonville, MI (US);
Kenneth C. Peterson, Ada, MI (US);
Darryl P. De Wind, West Olive, MI
(US)

(73) Assignee: Magna Mirrors of America, Inc.,
Holland, MI (US)

( * ) Notice: Subject to any disclaimer, the term of this
patent is extended or adjusted under 35
U.S.C. 154(b) by 101 days.

(21) Appl. No.: 18/413,274

(22) Filed: Jan. 16, 2024

(65) Prior Publication Data

US 2024/0240499 A1     Jul. 18, 2024

Related U.S. Application Data

(60) Provisional application No. 63/480,141, filed on Jan.
17, 2023.

(51) Int. Cl.
| | |
|---|---|
| *E05B 81/76* | (2014.01) |
| *B60Q 1/26* | (2006.01) |
| *E05B 85/10* | (2014.01) |

(52) U.S. Cl.
CPC ............ *E05B 81/76* (2013.01); *B60Q 1/2669*
(2013.01); *E05Y 2900/531* (2013.01)

(58) Field of Classification Search
CPC ...... E05B 85/10; E05B 85/103; E05B 85/107;
E05B 81/76; E05B 17/186; Y10S 292/31;
Y10T 292/0824; Y10T 70/8649

USPC ......................................................... 340/5.72
See application file for complete search history.

(56) References Cited

U.S. PATENT DOCUMENTS

| | | | |
|---|---|---|---|
| 1,554,171 A | * | 9/1925 | Ralph ..................... E05B 85/10 |
| | | | 292/164 |
| 5,371,659 A | | 12/1994 | Pastrick et al. |
| 5,497,305 A | | 3/1996 | Pastrick et al. |
| 5,669,699 A | | 9/1997 | Pastrick et al. |
| 5,823,654 A | | 10/1998 | Pastrick et al. |

(Continued)

FOREIGN PATENT DOCUMENTS

| | | | | |
|---|---|---|---|---|
| CN | 214943337 U | * | 11/2021 | |
| DE | 19943497 A1 | * | 3/2001 | ............. E05B 77/34 |

(Continued)

*Primary Examiner* — Carlos Lugo
(74) *Attorney, Agent, or Firm* — HONIGMAN LLP

(57) ABSTRACT

A vehicular exterior door handle assembly includes a handle
portion movable relative to a base portion. The handle
portion includes a grasping portion pivotable relative to the
base portion about a pivot axis. An electronic sensing device
is configured to detect a discrete movement of the handle
portion relative to the base portion. The detected discrete
movement is in at least one direction parallel to a plane of
the handle portion. The plane is parallel to the pivot axis and
parallel to a longitudinal axis of the handle portion. Based on
the electronic sensing device detecting an unlocking move-
ment, an electronic switch coupled to a latch mechanism of
the door is actuated. The unlocking movement includes two
or more discrete movements of the handle portion. When the
electronic switch is actuated, the electronic switch actuates
the latch mechanism of the door to unlock the door.

24 Claims, 12 Drawing Sheets

(56) References Cited

U.S. PATENT DOCUMENTS

| | | | |
|---|---|---|---|
| 6,072,403 A * | 6/2000 | Iwasaki | G07C 9/00309 |
| | | | 340/5.72 |
| 6,247,343 B1 * | 6/2001 | Weiss | E05B 85/18 |
| | | | 292/336.3 |
| 6,291,905 B1 | 9/2001 | Drummond et al. | |
| 6,349,450 B1 | 2/2002 | Koops et al. | |
| 6,396,408 B2 | 5/2002 | Drummond et al. | |
| 6,477,464 B2 | 11/2002 | McCarthy et al. | |
| 6,550,103 B2 | 4/2003 | Koops et al. | |
| 6,765,472 B2 * | 7/2004 | Suparschi | G07C 9/00309 |
| | | | 340/5.63 |
| 6,907,643 B2 | 6/2005 | Koops et al. | |
| 6,977,619 B2 | 12/2005 | March et al. | |
| 7,091,823 B2 * | 8/2006 | Leda | H03K 17/955 |
| | | | 292/336.3 |
| 7,091,836 B2 * | 8/2006 | Kachouh | E05B 81/78 |
| | | | 307/10.1 |
| 7,375,299 B1 * | 5/2008 | Pudney | E05B 81/78 |
| | | | 200/61.62 |
| 7,407,203 B2 | 8/2008 | Huizenga et al. | |
| 7,513,544 B2 * | 4/2009 | Cummins | E05B 85/16 |
| | | | 292/336.3 |
| 7,526,936 B2 * | 5/2009 | Niskanen | E05B 17/185 |
| | | | 70/423 |
| 8,333,492 B2 | 12/2012 | Dingman et al. | |
| 8,701,353 B2 * | 4/2014 | Patel | E05B 85/103 |
| | | | 292/201 |
| 8,786,401 B2 | 7/2014 | Sobecki et al. | |
| 8,801,245 B2 * | 8/2014 | De Wind | B60Q 1/2696 |
| | | | 455/420 |
| 9,741,505 B2 * | 8/2017 | Choi | H01H 13/14 |
| 9,903,142 B2 * | 2/2018 | Van Wiemeersch | E05B 81/77 |
| 10,174,529 B2 * | 1/2019 | Saitou | H01H 13/06 |
| 10,800,320 B2 | 10/2020 | Sobecki | |
| 10,864,846 B2 | 12/2020 | Peterson | |
| 11,441,338 B2 | 9/2022 | Blank et al. | |
| 11,846,122 B2 * | 12/2023 | Johansson | E05B 7/00 |
| 2002/0079708 A1 * | 6/2002 | Welsh | E05B 13/002 |
| | | | 292/57 |
| 2008/0190157 A1 * | 8/2008 | Mizuno | E05B 17/183 |
| | | | 70/455 |
| 2010/0007463 A1 | 1/2010 | Dingman et al. | |
| 2010/0088855 A1 | 4/2010 | Ruse et al. | |
| 2020/0102773 A1 | 4/2020 | Sobecki | |
| 2021/0332619 A1 | 10/2021 | Peterson et al. | |
| 2021/0370877 A1 | 12/2021 | Peterson | |
| 2022/0018168 A1 | 1/2022 | Cervone et al. | |
| 2022/0266796 A1 | 8/2022 | Peterson et al. | |
| 2022/0282534 A1 | 9/2022 | Peterson et al. | |
| 2022/0341226 A1 | 10/2022 | Sobecki et al. | |
| 2023/0001849 A1 | 1/2023 | Dingman et al. | |
| 2023/0304330 A1 * | 9/2023 | Schmitz | E05B 81/76 |
| 2024/0035318 A1 | 2/2024 | Sobecki et al. | |

FOREIGN PATENT DOCUMENTS

| | | | | |
|---|---|---|---|---|
| DE | 102011001892 A1 * | 10/2012 | | E05B 85/16 |
| EP | 1079049 A2 * | 2/2001 | | E05B 17/183 |
| EP | 1128002 A2 * | 8/2001 | | E05B 81/76 |
| EP | 1465119 A1 * | 10/2004 | | E05B 81/78 |
| EP | 1801324 A2 * | 6/2007 | | E05B 81/78 |
| JP | H06272434 A * | 9/1994 | | E05B 13/10 |
| KR | 2005043000 A * | 5/2005 | | |
| WO | WO-2005116376 A1 * | 12/2005 | | E05B 81/78 |

* cited by examiner

*Retracted*

*Deployed*

*Retracted*

*Deployed*

446

410 414 546

412a

VEHICULAR DOOR HANDLE ASSEMBLY

CROSS REFERENCE TO RELATED APPLICATION

The present application claims the filing benefits of U.S. provisional application Ser. No. 63/480,141, filed Jan. 17, 2023, which is hereby incorporated herein by reference in its entirety.

FIELD OF THE INVENTION

The present invention relates to door handles for vehicles and, more particularly, to a door handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door.

SUMMARY OF THE INVENTION

An example of a vehicular exterior door handle assembly includes a base portion configured to mount at a door of a vehicle equipped with the vehicular exterior door handle assembly. A handle portion is mounted at the base portion and is movable relative to the base portion along a mounting plane. An electronic sensing device is configured to detect discrete movements of the handle portion along the mounting plane. A control module that includes electronic circuitry is disposed remote from the vehicular exterior door handle assembly and is configured to control an electronic switch coupled to a latch mechanism of the door. The control module, based on the electronic sensing device detecting one or more discrete movements of the handle portion that correspond to an unlocking movement, actuates the electronic switch. With the base portion mounted at the door of the vehicle and when the electronic switch is actuated, the electronic switch actuates the latch mechanism of the door to unlock and/or open the door.

Another example of a vehicular exterior door handle assembly includes a base portion configured to mount at a rear door or liftgate or tailgate of a vehicle equipped with the vehicular exterior door handle assembly. A handle portion is mounted at the base portion. With the base portion mounted at the tailgate of the vehicle, the handle portion is graspable by a user to actuate a latch mechanism for opening the tailgate. An illumination module is disposed at the vehicular exterior door handle assembly and includes an illumination source that emits light when electrically powered. With the vehicular exterior door handle assembly mounted at the rear door or liftgate or tailgate of the vehicle, and when the illumination source is electrically powered to emit light, light emitted by the illumination source is viewable exterior and rearward of the equipped vehicle. The vehicle includes a primary center high mounted stop light (primary CHMSL) disposed remote from the vehicular exterior door handle assembly, and the primary CHMSL is electrically operable to emit light based on activation of a brake system of the vehicle. With the vehicular exterior door handle assembly mounted at the rear door or liftgate or tailgate of the vehicle, the illumination source is electrically powered to emit light in response to activation of the brake system of the vehicle and based on a determination that light emitted by the primary CHMSL is obstructed from view.

These and other objects, advantages, purposes and features of the present invention will become apparent upon review of the following specification in conjunction with the drawings.

BRIEF DESCRIPTION OF THE DRAWINGS

FIGS. 6A and 7A are views of additional interior door handle assemblies in respective flush position or retracted position;

FIGS. 6B and 7A are views, respectively, of the interior door handle assemblies of FIGS. 6A and 7A in the extended position or deployed position;

DESCRIPTION OF THE PREFERRED EMBODIMENTS

Figure 1:
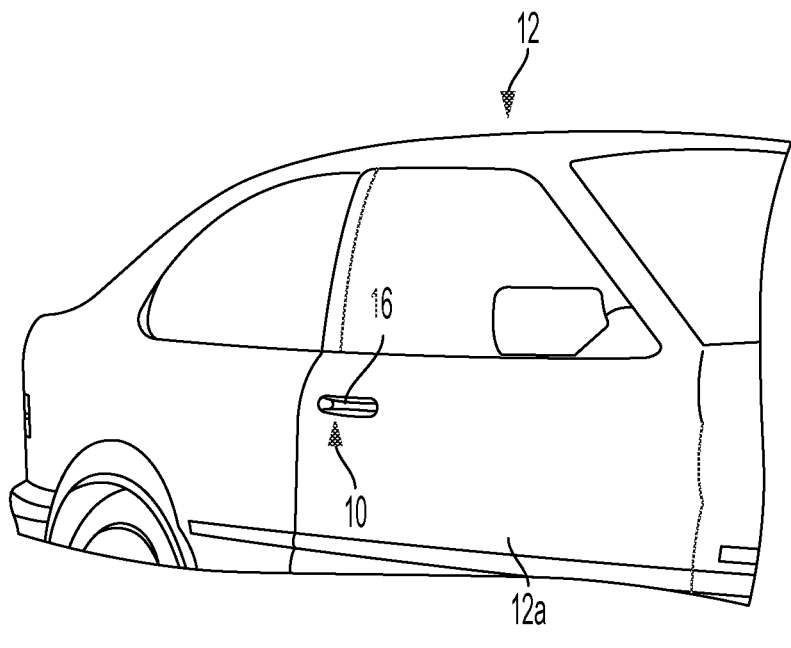
FIG. 1 is a perspective view of a vehicle equipped with a door handle assembly.
Figure 2:
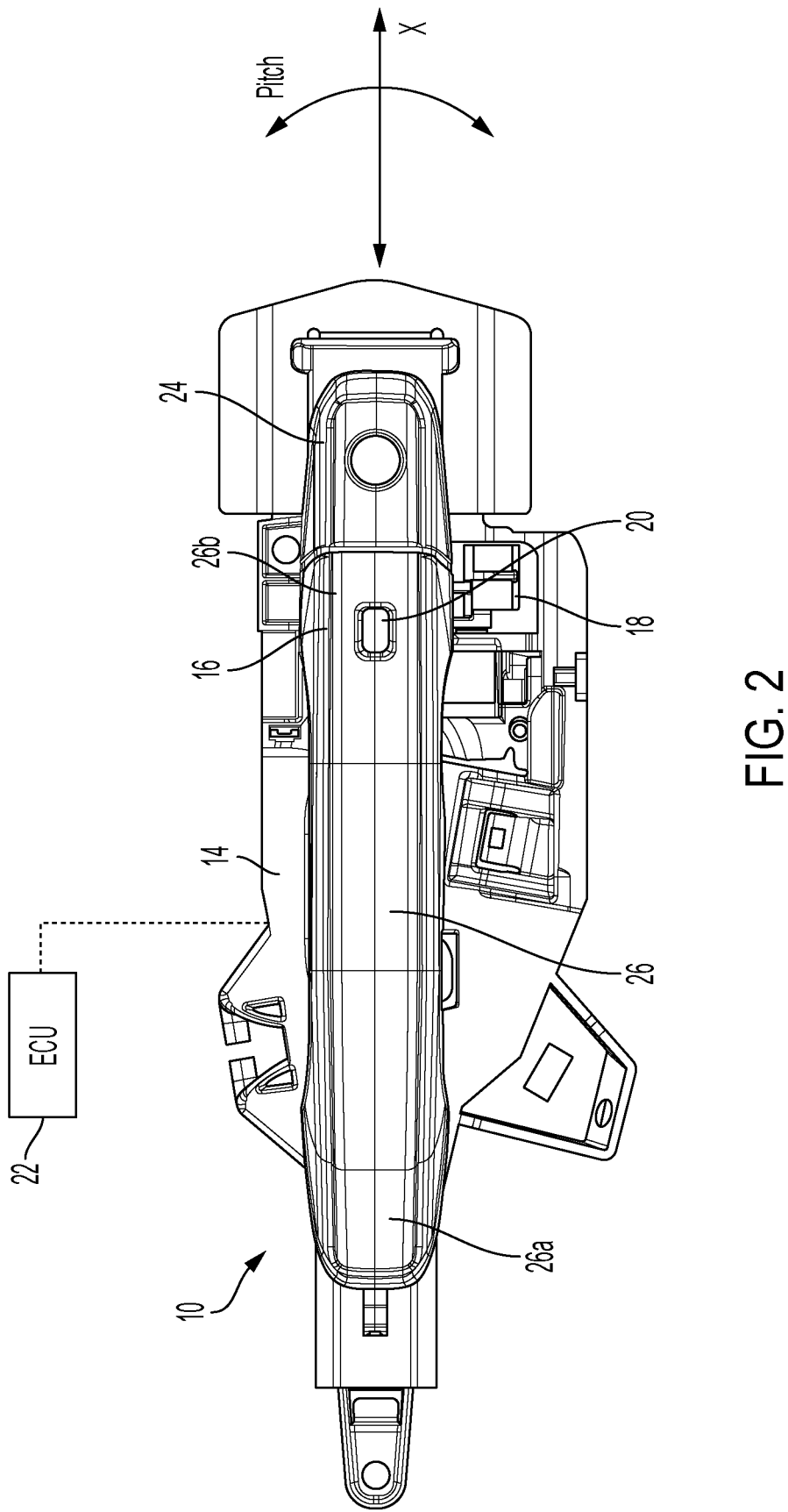
FIG. 2 is a perspective view of a door handle assembly, where at least a portion of the handle is movable along a plane of the base portion.

Referring now to the drawings and the illustrative embodiments depicted therein, a vehicle door handle assembly or module or unit 10 is mountable to a door 12a of a vehicle 12 and operable to release a latch mechanism (not shown) of the door 12a to open the vehicle door (FIG. 1). The vehicle door handle assembly 10 includes a base portion or bracket 14 that is mountable to the vehicle door 12a and a handle or strap portion 16 that is movably or pivotally mounted to the bracket 14 (FIG. 2). The handle portion 16 may be manually moved or pivoted relative to the bracket 14 (such as via pulling by a user) to actuate a bellcrank 18 at the base portion 14, which in turn actuates or releases the latch mechanism of the door to open the vehicle door. Optionally, the handle portion 14 includes a button or switch mechanism 20, whereby the user grasps or presses the handle portion 14 and actuates the button or switch mechanism 20 to release the latch mechanism to open the door 12*a*.

The handle assembly 10 may comprise any suitable type of handle assembly, and may include or incorporate aspects of the door handle assemblies described in U.S. Pat. Nos. 8,786,401; 6,977,619; 7,407,203; 6,349,450; 6,550,103; 6,907,643; 8,801,245, 8,333,492, and/or U.S. Publication Nos. US-2022-0018168; US-2022-0282534; US-2022-0341226; US-2010-0088855; US-2010-0007463 and/or US-2020/0102773, and/or U.S. patent application Ser. No. 18/359,114, filed Jul. 26, 2023, now U.S. Pat. No. 12,331, 567, which are all hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly. Furthermore, aspects of the handle assembly 10 may be suitable for use with a liftgate handle assembly for a liftgate or tailgate of a vehicle.

The handle assembly 10 may comprise or may be associated with an electronic control unit (ECU) 22 or control module, such as a body control module (BCM), that controls a lock and unlock function of the handle assembly 10 so that, when the door of the vehicle is unlocked and the handle portion 16 is pulled or grasped by the user to actuate the bellcrank 18 or the switch mechanism 20, the latch mechanism actuates and opens the door, and, when the door of the vehicle is locked, the latch mechanism does not actuate to open the door when the handle portion is pulled or grasped by the user. In other words, the ECU 22 only allows the latch mechanism to actuate to open the door when the door is unlocked. For example, the control module may be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the BCM 22 may unlock the vehicle door in response to a user input or sequence of user inputs at the vehicle door or handle assembly. For example, a numeric keypad may be disposed at the vehicle door and the BCM 22 may unlock the door in response to a numeric code or sequence input at the keypad.

Figure 3:
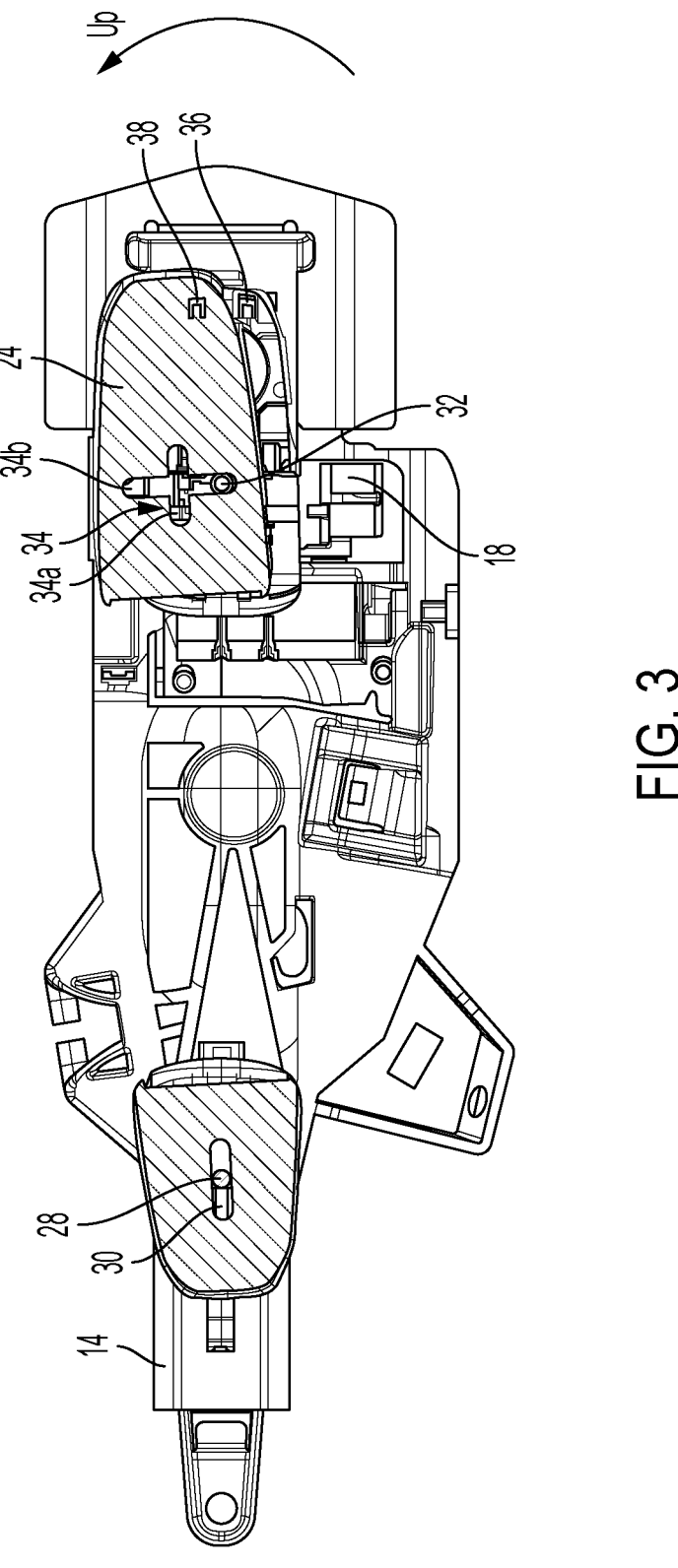
FIG. 3 is a sectional view of the door handle assembly of FIG. 2, where the handle is pivoted along the plane of the base portion.

Referring to FIGS. 2 and 3, the handle portion 16 is movable relative to the base portion 14 and the handle assembly includes one or more electronic switches that are triggered or actuated based on movement of the handle portion 16 relative to the base portion 14, where actuation of the electronic switch or a sequence of actuations of the one or more electronic switches causes the BCM 22 to unlock the vehicle door. For example, movement of the handle portion 16 in a first direction from a default or resting position may actuate a first electronic switch and movement of the handle portion in an opposite second direction from the default position may actuate a second electronic switch. In other words, the sequence of movements of the handle portion 16 relative to the base portion 14 that actuates the one or more electronic switches defines a keyless entry combination. Each movement of the handle portion 16 may be considered a discrete input and one or more specific inputs or sequence of inputs may be required to unlock the vehicle door.

In the illustrated example, the handle 16 includes a first, non-pivotable, slidable portion 24 that is coupled to the base portion 14 and a second, pivotable portion 26 that pivots laterally from the side of the vehicle (i.e., in a direction or plane that is generally normal to or perpendicular to the side of the vehicle and the mounting plane of the door handle assembly) relative to the slidable portion 24 and the base portion 14 when grasped and pulled by the user. The pivotable portion 26 may be coupled to the bellcrank 18 to actuate the latch mechanism when pulled by the user and pivoted relative to the base portion 14. Thus, the pivotable portion 26 of the handle 16 includes a first end or base end or pivoting end 26*a* that is pivotally attached to the base portion or slidable portion, and a second end or swing end 26*b* opposite the first end 26*a* that moves laterally outward from the vehicle when the handle portion 16 is pulled by the user and the pivotable portion 26 pivots about the pivoting end 26*a* relative to the base portion 14.

The slidable portion 24 is movable or slidable relative to the base portion 14 in a plurality of directions along a plane at the base portion 14 and along the side of the vehicle (e.g., in a direction or plane that is generally parallel to the side of the vehicle at the location where the door handle assembly is mounted), and the pivotable portion 26 may be coupled to the slidable portion 24 such that the pivotable portion 26 moves together and in tandem with the slidable portion 24 relative to the base portion 14. Put another way, the slidable portion 24 (and the pivotable portion 26) is movable (e.g., within a door handle pocket region of the door) relative to the base portion in at least one direction that is along the outer panel of the door. With the door handle assembly mounted at the door, the slidable portion 24 may move in at least one axial direction (that may be perpendicular to a pivot axis of the pivotable portion relative to the base portion) and at least one pivotal direction (that may be about an axis perpendicular to the pivot axis and perpendicular to the axial direction). The pivot axis of the pivotable portion 26 may be perpendicular to a cross-vehicle axis that extends laterally across the vehicle.

As shown in FIG. 2, the slidable portion 24 is movable relative to the base portion 14 along two degrees of freedom. Specifically, the slidable portion 24 is movable along an X axis (e.g., left and right in FIG. 2) along the side of the vehicle and in pitch directions (e.g., clockwise and counterclockwise in FIG. 2). The slidable portion 24 may be movable within any suitable range of motion, such as along a Y axis perpendicular to the X axis. When the slidable portion 24 is moved along its range of motion, the one or more electronic switches at the handle assembly are triggered to register the movements as user inputs.

As shown in FIG. 3, motion of the slidable portion 24 relative to the base portion 14 is constrained by pin-in-slot joints coupling the slidable portion 24 to the base portion 14. A first pin 28 extends from the base portion 14 and is received in a linear slot 30 of the slidable portion 24 at or near the first end 26*a* of the pivotable portion 26. A second pin 32 extends from the base portion 14 and is received in a second, cross or t-shaped slot 34 of the slidable portion 24 at or near the second end 26*b* of the pivotable portion 26. The first pin 28 and the second pin 32 are fixed relative to the base portion 14 and constrain the slidable portion 24 from moving laterally (i.e., outward from the base portion). The cross-shaped slot 34 includes a first linear portion 34*a* that is aligned with or parallel to the linear slot 30 and a second linear portion 34*b* that is connected to and perpendicular to the first linear portion 34*a*. Optionally, the second portion 34*b* of the slot 34 may comprise an arcuate portion or other suitably shaped slot portion connected to the first linear portion 34*a*. When the handle portion 16 is in the default position (e.g., FIG. 2), the second pin 32 may be positioned at the intersection of the first portion 34*a* and the second portion 34*b* of the cross-shaped slot 34.

Thus, when the slidable portion 24 is moved linearly along the X axis (e.g., left and right in FIG. 2 or forward and backward along the side of the vehicle), the first pin 28 travels along the linear slot 30 and the second pin 32 travels along the first linear portion 34*a* of the second slot 34. When the slidable portion 24 is pitched or pivoted (e.g., clockwise or counterclockwise in FIG. 2, with the end of the handle moving downward or upward at the side of the vehicle), the second pin 32 travels along the second linear portion 34*b* of the second slot 34 and the handle portion 16 pivots about the first pin 28. For example, in FIG. 3, the handle portion 16 is shown pivoted to an up position, where the slidable portion 24 is moved counterclockwise from the default position (FIG. 2) about the first pin 28 and the second pin 32 travels along the second linear portion 34*b* of the second slot 34.

The one or more electronic switches are operable to detect the user input at the travel limits of the slidable portion 24. In other words, one of the electronic switches is triggered when the slidable portion 24 is moved along a degree of freedom and reaches a travel stop (or optionally approaches the travel stop and is within a threshold distance of the travel stop). For example, a portion of the handle assembly may be configured to engage and actuate the switch when the slidable portion 24 reaches its travel stop. Optionally, the one or more electronic switches may be configured to detect movement of the slidable portion 24 along the full range of motion of the handle portion, such as via an analog joystick switch coupled to the slidable portion 24, such that the user input detected by the one or more electronic switches is based on the degree to which the handle is moved along its range of motion.

Optionally, the electronic switch comprises a position sensor, such as a hall effect sensor or a potentiometer, configured to determine or detect movement or changes in position of the slidable portion 24 relative to the base portion 14. For example, the electronic switch comprises a magnetic sensor or sensing device 36 disposed at the base portion 14 and configured to determine position of the handle portion 16 relative to the base portion 14 based on detection of a magnetic field from a magnetic device 38 disposed at the handle portion 16. The magnetic device 38 may be aligned with the magnetic sensing device 36 when the handle portion 16 is in the default position, and the magnetic device 38 moves with the handle portion 16 so that the magnetic sensing device 36 senses movement of the handle portion 16 based on movement of the magnetic device 38.

As the user moves the handle portion 16 via movement of the slidable portion 24 relative to the base portion 14, the ECU 22 receives inputs corresponding to the movement of the handle portion 16. When the user provides inputs corresponding to an unlock code, such as a specified sequence of movements, the ECU 22 unlocks the door. For example, a sequence of inputs may include one or more, two or more, three or more, or four or more discrete movements of the handle, such as, for example, moving the handle toward the rear of the vehicle, then pivoting the handle upward, then moving the handle toward the rear of the vehicle again, or any combination of forward movement, rearward movement, upward pivoting movement, and downward pivoting movement. The one or more movements corresponding to the unlock code may be programmable by the user. Based on determination that the person grasping the handle portion 16 is an authorized user of the vehicle (e.g., based on detection of an authorized keyfob or mobile device at the vehicle, such as at or near the vehicle door of the handle that is being grasped), the door may unlock responsive to a single sliding movement of the slidable portion 24 relative to the base portion 14. For example, when no authorized keyfob is detected at or near the vehicle, the unlock code may include two or more discrete movements of the slidable portion 24 relative to the base portion 14 (e.g., a rearward movement followed by an upward pivoting movement) and, when the authorized keyfob is detected at or near the vehicle, the unlock code may include only one movement of the slidable portion 24 relative to the base portion 14 (e.g., a rearward movement) or the door may be unlocked responsive to any single movement of the slidable portion 24 along the mounting plane of the door.

Optionally, the unlock sequence may include one or more inputs other than movement of the slidable portion 24 of the handle, such as actuation of the button 20 at the handle portion 16, pivoting of the handle portion 16 outward from the base portion 14, or an input at a keyfob or user device in communication with the ECU 22. Furthermore, the ECU 22 may disable the unlock function if the user provides one or more incorrect sequences of movements. The handle assembly 10 may be a dumb input device, meaning that the unlock code information is programmed and stored at the BCM 22 that is remote from the handle assembly.

Thus, the handle assembly 10 incorporates a factory keyless entry system into the door handle while eliminating the need for a numeric keypad as an input device. The handle assembly is adaptable across left hand and right hand door handles.

Figure 4:
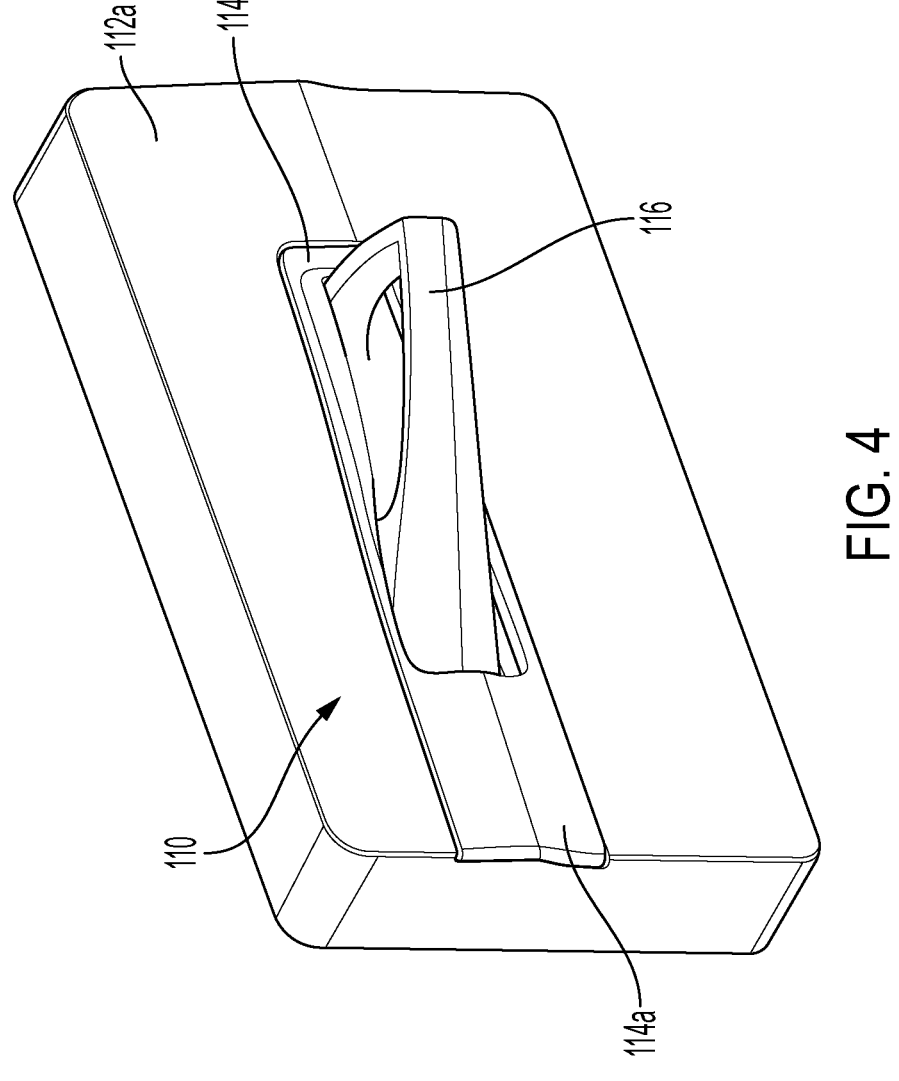
FIG. 4 is a perspective view of an interior door handle assembly.
Figure 5:
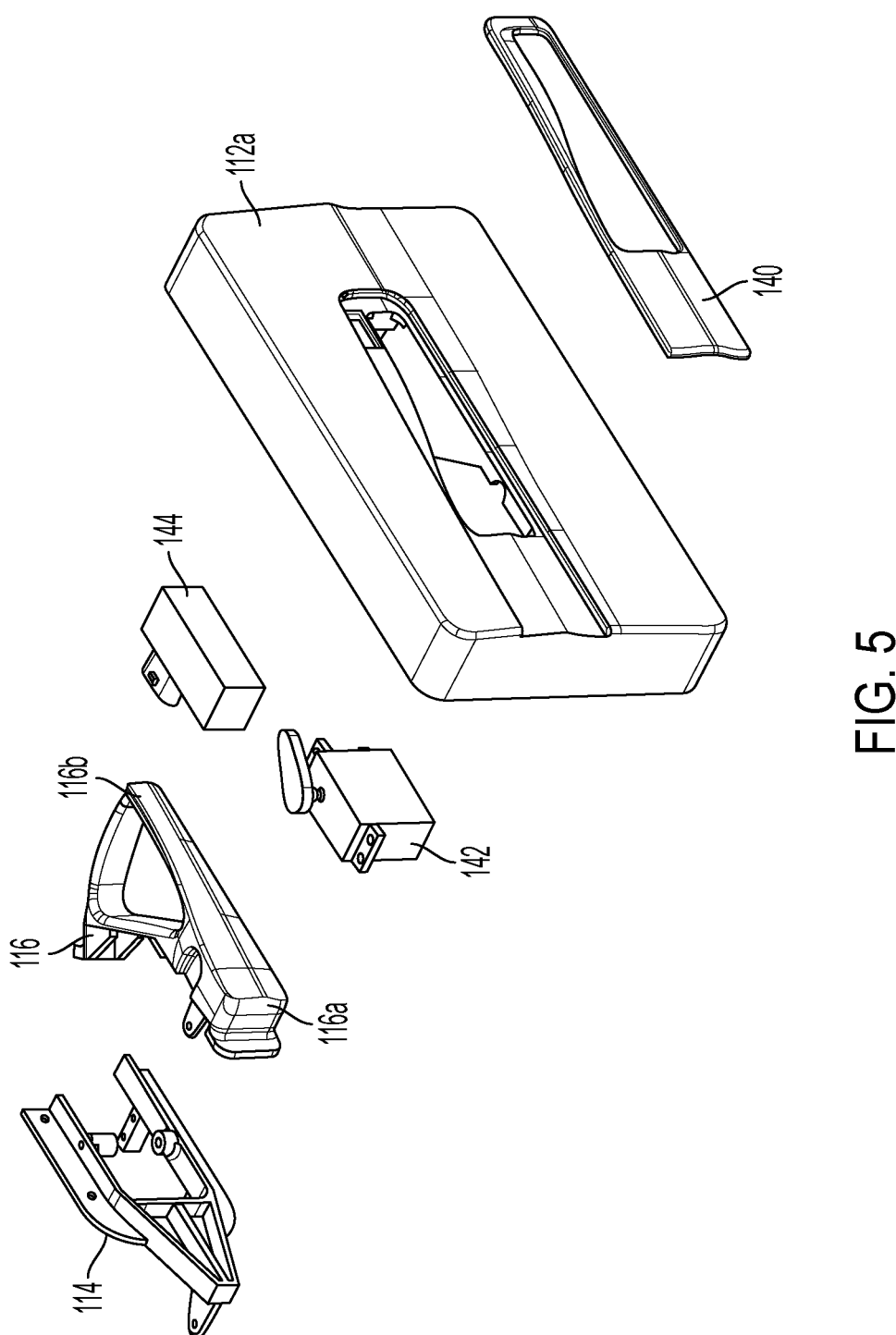
FIG. 5 is an exploded view of the interior door handle assembly of FIG. 4.

Referring to FIGS. 4 and 5, an interior door handle assembly or module or unit or extendable flush door handle assembly 110 is mountable to a door 112*a* at an interior portion of the vehicle and operable to release the latch mechanism of the door. The interior handle assembly 110 includes a base portion or bracket 114 that is mountable to the door 112*a* and a handle or strap portion 116 that is movably or pivotally mounted to the bracket 114. When not in use, the handle portion 116 is at an initial rest or recessed or non-use position and is received or disposed at or partially in the base portion 114 so that an outer surface of the handle portion 116 is generally flush with or generally coplanar with (or protruding only slightly from or recessed slightly in) the outer surface 114*a* of the base portion 114 or the inner door panel at the interior portion of the vehicle, whereby the handle portion 116 is not readily usable by a user. Optionally, a trim panel or bezel 140 may be disposed at the interior side of the vehicle door 112*a*, such that the outer surface of the handle portion 116 is flush with and corresponds to or matches the trim panel 140 when in the recessed position.

The handle portion 116 is mechanically pivotable or movable or laterally movable relative to the door and the base portion 114 via an actuator 142 to move to its deployed or ready or operational or grippable or graspable or person-operable position and is then graspable or grippable by the user where the handle portion 116 may be manually moved (such as via pulling by the user) further from the non-use position to actuate the bellcrank at the base portion 114, which in turn actuates or releases the latch mechanism of the door to open the vehicle door. For example, the actuator 142 may deploy the handle portion in response to a user input (such as an unlock input that unlocks the vehicle doors) or automatically in response to a vehicle condition (such as in response to a gear selector or propulsion selector of the vehicle being placed in a park position or the vehicle being turned off), or in response to sensing proximity of the person's hand at the handle region when the vehicle is parked.

The handle portion 116 includes a first or base end 116a that is pivotally mounted at the base portion 114 and a second or swing end 116b opposite the first end 116a that moves laterally outward from the base portion 114 when the handle pivots to the extended position. The actuator 142 may be coupled to the base portion 114 and configured to, when electrically operated to deploy the handle portion 116, pivot the handle portion 116 from the recessed position to the deployed position. After the handle portion 116 is manually moved or pulled farther from the deployed position to open the vehicle door, the handle assembly 110 may be configured to return the handle portion 116 to the recessed position. For example, the handle portion 116 may be biased toward the recessed position via a biasing element or the actuator 142 may be operable to pivot the handle portion 116 from the deployed position toward the recessed position.

Further, the handle assembly 110 may include an electronic lighting/sensing module 144 disposed at the base portion 114 and that includes one or more sensors and/or one or more light sources. For example, the electronic module 144 may include one or more light sources that are electrically operable to emit light that illuminates the handle portion 116, such as when the handle is in the deployed position (e.g., the light source may be disposed within the base portion or within the door and operates to emit light when the door handle is deployed so that the door handle is backlit from within the door panel when the door handle is deployed). Thus, the vehicle occupant may more easily see the handle portion 116 for exiting the vehicle during darkened conditions. Moreover, the electronic module 144 may include one or more motion or gesture sensors configured to detect presence of the occupant's hand or a gesture of the vehicle occupant at or near the handle assembly 110. For example, the sensor may view through an aperture formed through the bezel 140. The lighting and gesture sensing module may incorporate characteristics of the sensors and door handles described in U.S. Pat. No. 10,864,846 and/or U.S. Pat. Pub. Nos. US-2022-0266796, which are hereby incorporated herein by reference in their entireties.

In response to detecting presence of the occupant's hand or determining the gesture by the occupant, the actuator 142 may deploy the handle portion 116 and/or the electronic module 144 may activate the light sources to illuminate the handle portion 116. For example, if the handle portion 116 is in the recessed position and presence of the occupant's hand is detected, the actuator 142 deploys the handle portion 116. If the handle portion 116 is deployed and presence of the occupants hand is detected without the occupant pulling the handle portion to open the door, the light sources may illuminate the handle portion, such as if the occupant is reaching for the handle but cannot find it in the dark. Such deployment when a hand is detected may be limited to situations where the vehicle is in not moving, such as when the vehicle is parked.

The electronic module 144 may also sense occupant hand gestures for moving the handle portion 116 from the deployed position to the recessed position, or for unlocking or locking the vehicle doors. For example, different gestures may correspond to different functions of the handle assembly 110, such as an upward hand gesture for unlocking the vehicle door and a downward hand gesture for locking the vehicle door.

Thus, the handle assembly 110 provides an interior door handle assembly that may automatically deploy the door handle with lighting and gesture sensing. That is, the door handle assembly may light the door handle to help the occupant find it. The handle assembly has a flush design when not being used and automatically deploys when the rider reaches for the handle.

Figures 6A, 6B, 7A, 7B:
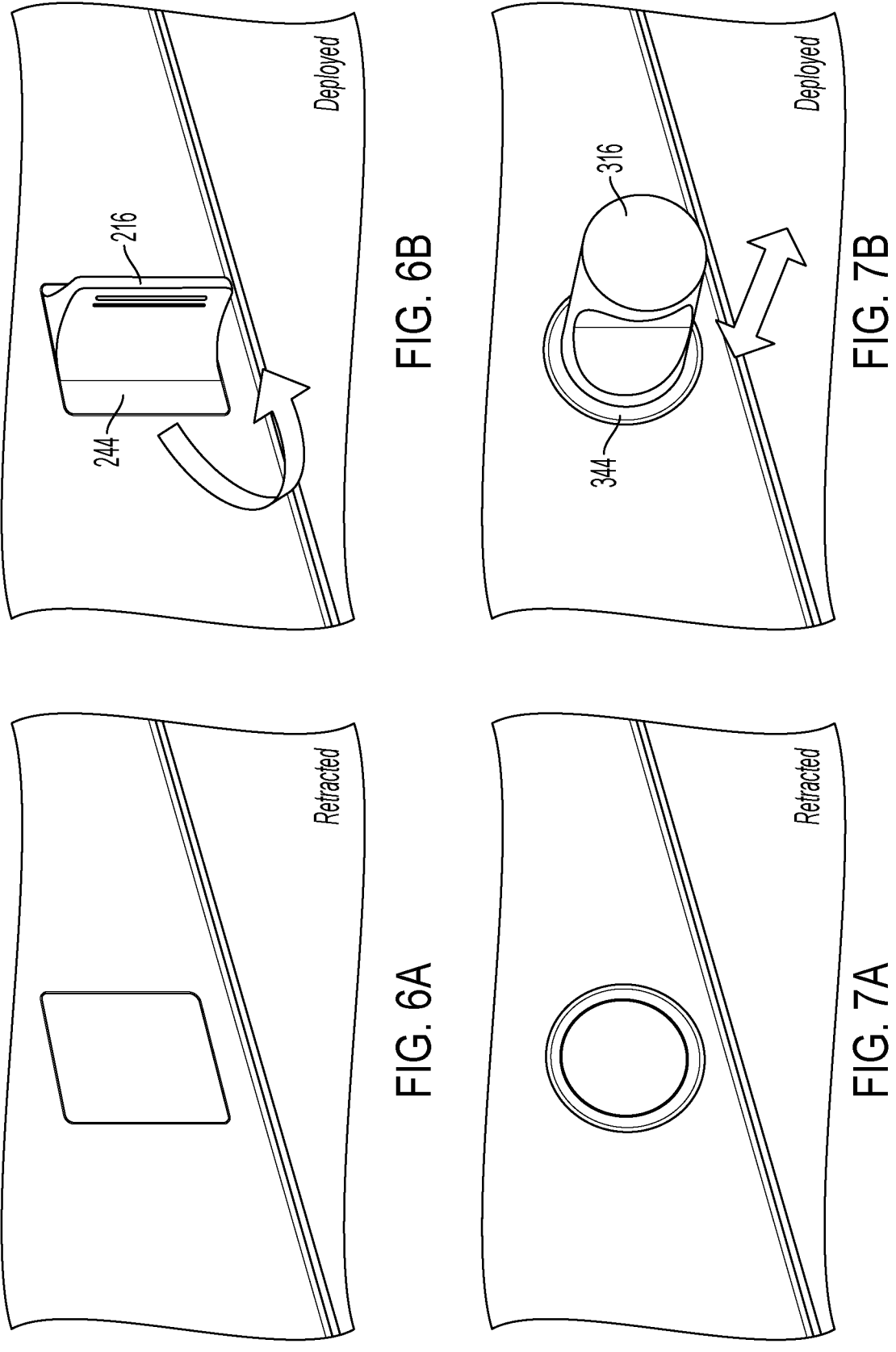
Figures 8, 9:
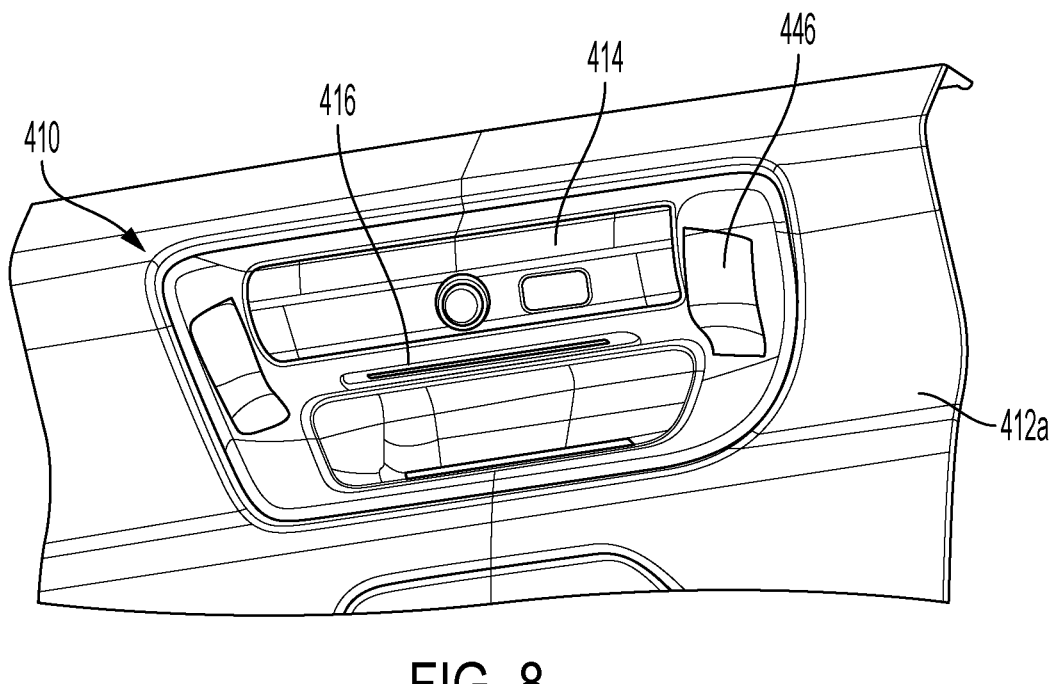
FIGS. 8 and 9 are perspective views of a door handle assembly disposed at a tailgate or liftgate of a vehicle.
Figure 10:
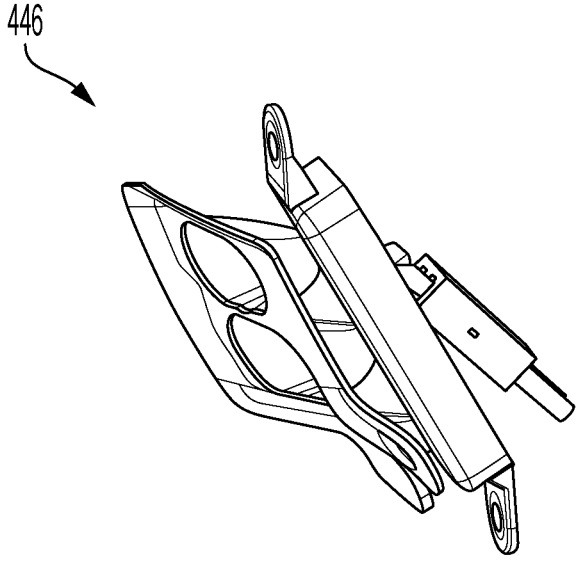
FIG. 10 is a perspective view of an incandescent light module of the door handle assembly of FIGS. 8 and 9.
Figure 11:
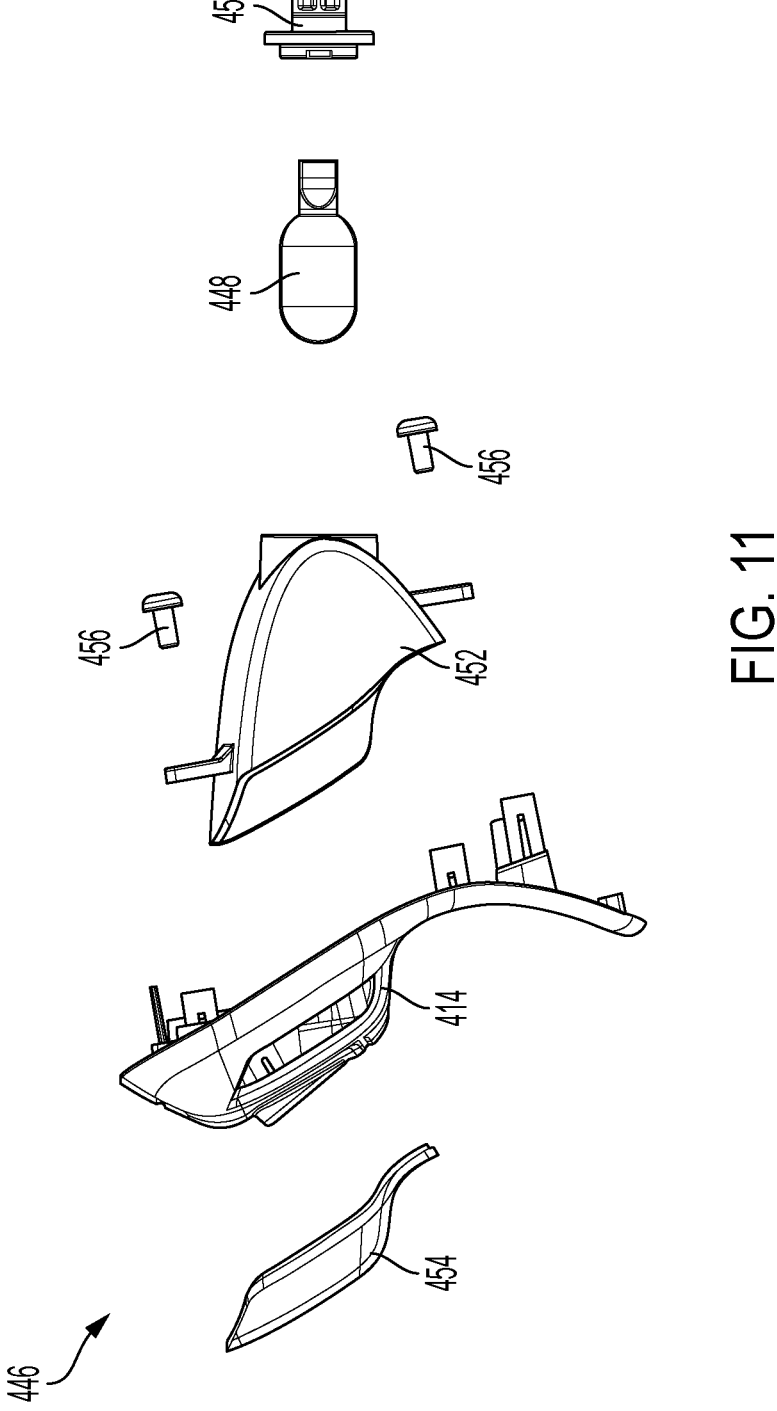
FIG. 11 is an exploded view of the incandescent light module of FIG. 10.

Although shown as including a strap handle that is pivotable relative to the base portion from a flush or recessed position to present a grasping portion of the handle for grasping and pulling by the user, the handle assembly may comprise any suitable style handle portion. For example, FIGS. 6A and 6B depict a paddle style handle portion 216 that is pivotable about a vertical pivot axis from a flush or recessed position (FIG. 6A) to a deployed position (FIG. 6B) where the paddle 216 is presented for manipulation by the user. For example, the user may pull or push the paddle 216 (or may actuate or touch a touch sensor at the paddle that is only accessible when the paddle is deployed). Optionally, the strap handle may be pivotable about a horizontal pivot axis between the flush position and the deployed position. The electronic module 244 may include light sources that illuminate an area about the handle portion 216, such as side regions along the handle portion 216 and/or regions above and below the handle portion 216.

Optionally, the handle portion, such as a cylindrical handle portion 316, may move laterally relative to the door from a flush position (FIG. 7A) to a deployed position (FIG. 7B), where the cylindrical handle portion or knob 316 is presented for manipulation by the user. For example, the user may push or pull or twist the knob 316 (or may actuate or touch a touch sensor at the knob that is only accessible when the knob is deployed). The electronic module 344 may include light sources that illuminate a perimeter region circumscribing the handle portion 316.

Optionally, the handle assembly may be disposed at a tailgate of the vehicle (e.g., a pickup truck), where, when the handle portion is manipulated by the user, the latch mechanism opens the tailgate to provide the user access to the bed of the vehicle. Further, the handle assembly may be disposed at a liftgate or hatch of the vehicle for accessing a cargo area of the vehicle. The handle assembly includes one or more light modules that may be actuatable in response to a determination that the center high mounted stop light (CHMSL) or third brake light of the vehicle is obstructed or inoperable.

For example, and with reference to FIGS. 8-14, a vehicle door handle assembly or module or unit 410 is mountable to a door (e.g., a tailgate or liftgate) 412a of a vehicle and operable to release a latch mechanism of the tailgate 412a to open the tailgate. The handle assembly 410 includes a base portion or bracket 414 that is mountable to the tailgate 412a and a handle or strap portion 416 that is mounted to the bracket 414 and movable or pivotable or actuatable (such as via pulling by the user) to release the latch mechanism of the tailgate to open the tailgate. The handle assembly 410 includes one or more light modules 446 disposed at the base portion 414 and operable to emit light that is viewable by a person or other vehicle rearward of the vehicle. The light module 446 may be operated to emit light in response to a user input, such as to provide a brake light, a reverse light, or a turn signal for the vehicle.

In the illustrated example, the light module 446 is operable to provide a CHSML or third brake light for the vehicle, where the light module 446 is electrically operated to emit light when the driver activates the brakes of the vehicle. The control module may be configured to operate the light module 446 as the CHMSL of the vehicle when a primary CHMSL is obstructed or inoperable. For example, an object in the bed of the vehicle (such as tall items in the truck box, a segmented folding tonneau cover, or bed-top tents or camper attachments) may obstruct the view of a person exterior and rearward of the equipped vehicle from seeing light emitted by the primary CHMSL. Thus, the light module 446 may be selectively operated to retain CHSML functionality when the primary CHMSL is obstructed.

The vehicle may include one or more sensors configured to detect potential obstruction of the primary CHMSL. For example, the detection could be achieved using beam interruption or a light curtain, or via processing of image data captured by a camera of a camera monitoring system (CMS) mounted in or around or proximate to the primary CHMSL area. The control module may determine an obstruction based on a determined height of an object in the bed of the truck. For example, the system may determine an obstruction of the primary CHMSL via detection of an object taller than a threshold height from the bed of the vehicle (such as 24 inches or taller, 36 inches or taller, 46 inches or taller, or 48 inches or taller). The threshold height may be based on a known height of the primary CHMSL above the truck bed.

Figure 14:
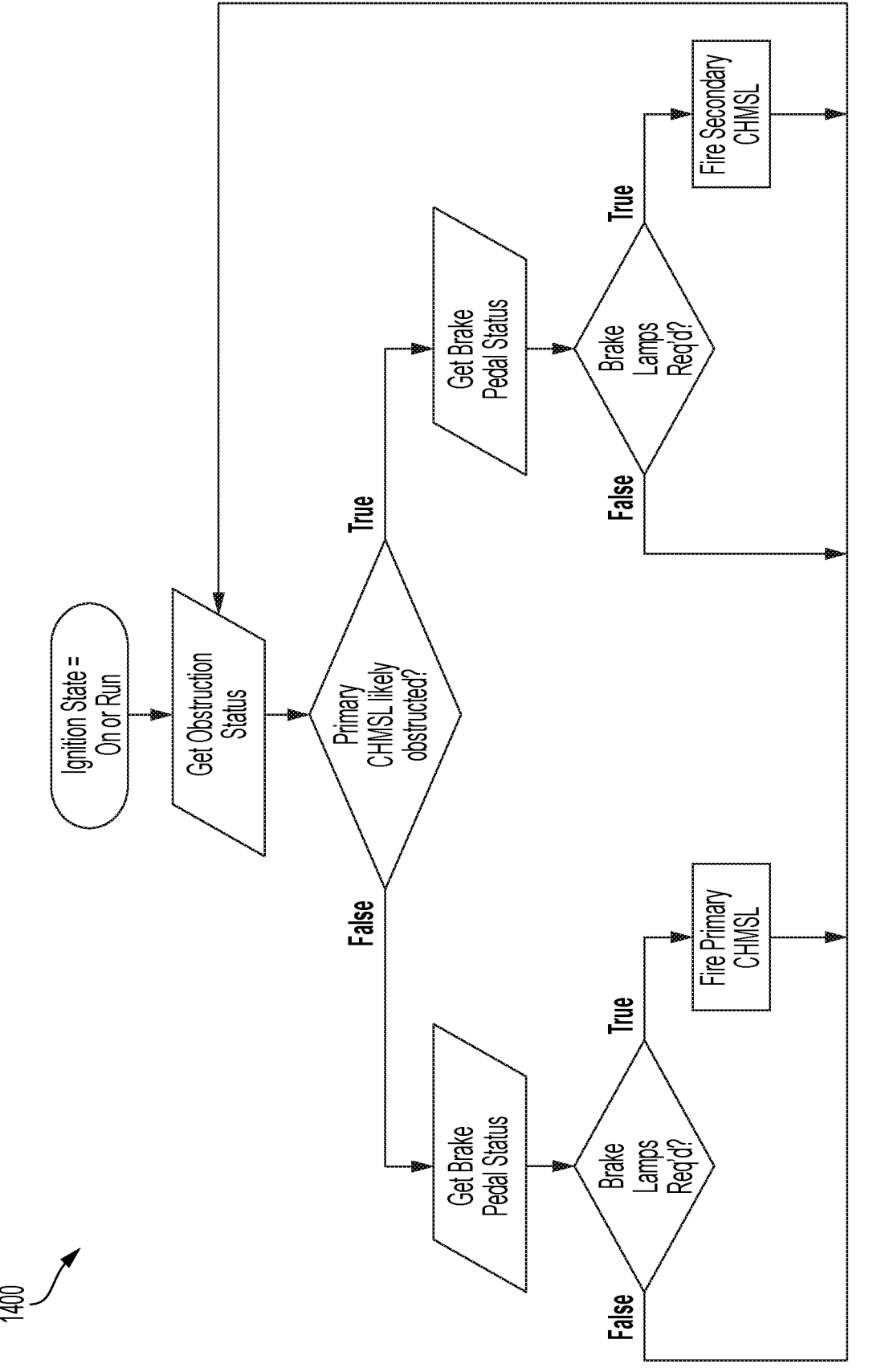
FIG. 14 is a flow diagram depicting operation of the light module as a secondary CHMSL when the primary CHMSL of the vehicle is obstructed.

As shown in the flow diagram 1400 of FIG. 14, the vehicle control module determines whether the primary CHMSL is likely at least partially obstructed (whereby the stop light is likely not readily viewable by a driver of a following vehicle when the equipped vehicle's brakes are activated) and then, when the brakes are activated, operates the primary CHMSL when it is determined that the primary CHMSL is not obstructed and operates the secondary CHMSL of the light module 446 in response to determination that the primary CHMSL is at least partially obstructed. The control module, in response to determining that the primary CHMSL is obstructed, may deactivate the primary CHMSL and activate the secondary CHMSL. In some examples, when the primary CHMSL is not obstructed, only the primary CHMSL is activated and, when the primary CHMSL is obstructed, both the primary CHMSL and the secondary CHMSL are activated.

As shown in FIGS. 8-11, the handle assembly 410 may comprise a dual lamp handle assembly with incandescent bulbs. In other words, the handle assembly 410 includes two light modules 446 (e.g., one on each side of the handle portion) and each light module 446 includes an incandescent bulb 448 (or other light emitting device or element). The incandescent bulb 448 is received at a socket 450 of the light module 446 (that is electrically connected to a wire harness of the vehicle) and accommodated within a reflector housing 452. The reflector housing 452 is received at a rear surface of the base portion 414 and a lens 454 is disposed over the reflector housing at an outer surface of the base portion 414. One or more fasteners 456 (e.g., threaded fasteners such as screws) may attach the reflector housing 452 and/or the lens 454 at the base portion 414.

Figure 12:
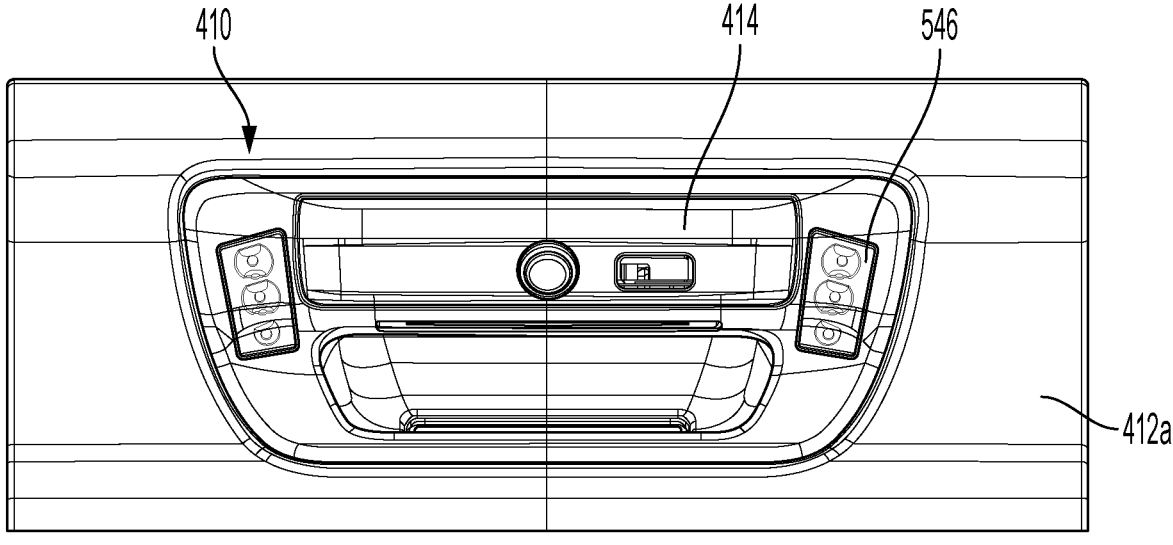
FIG. 12 is a perspective view of a door handle assembly disposed at a tailgate or liftgate of a vehicle and having an LED light module.
Figure 13:
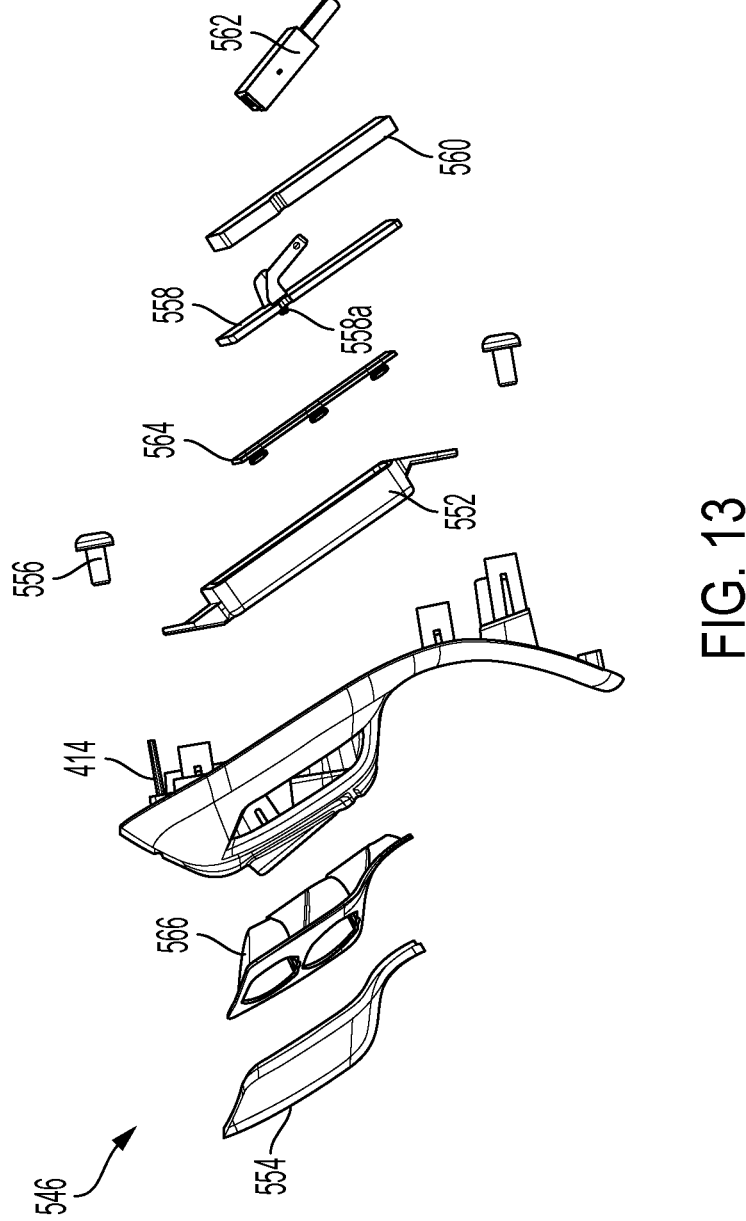
FIG. 13 is an exploded view of the LED light module of FIG. 12.

As shown in FIGS. 12 and 13, a light module 546 may include a light emitting diode (LED) light source that includes one or more LEDs 558a disposed on an LED printed circuit board (LED PCB) 558. The LED PCB 558 is electrically connected to the vehicle wire harness via an electrical connector 560 and potting compound 562. A first lens 564 is disposed over the one or more LEDs 558a and the LED PCB 558 is accommodated by a housing 552. The housing 552 is received at the base portion 414 such that the LEDs 558 are positioned at a reflector 566 and emit light through a main lens 554. The housing 552, reflector 566 and main lens 554 may be attached at the base portion 414 via one or more fasteners 556 (e.g., threaded fasteners such as screws).

Thus, the door handle assembly integrates a redundant CHMSL into the pickup tailgate handle or bezel so that, when an obstruction of the primary CHMSL is determined, the secondary CHMSL at the handle assembly may be activated with the brake lights. Optionally, the lighting device, when operated to emit light, may provide illumination at the rear of the vehicle. The lighting device may include a separate auxiliary light that, when powered, emits white light downward at the rear of the vehicle to illuminate the area rearward of the vehicle. Optionally, the lighting device may utilize aspects of the light modules and devices described in U.S. Pat. No. 10,800,320, which is hereby incorporated herein by reference in its entirety.

Optionally, the door handle assembly may include a light module or lighting element, such as for illuminating the door handle portion or the inner portion of the door handle portion, so that the user can readily see and discern the door handle when approaching the vehicle in low lighting conditions. The lighting element may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 11,441,338; 8,786,401; 8,801,245; 5,371,659; 5,497,305; 5,669,699; 5,823,654; 6,349,450; 6,550,103, and/or U.S. patent Pub. Nos. US-2023-0001849 and/or US-2021-0332619, which are all hereby incorporated herein by reference in their entireties.

Optionally, the door handle assembly or module may include or may be associated with an antenna for receiving signals from or communicating with a remote device. For example, the antenna (such as, for example, an antenna of the types described in U.S. Pat. No. 6,977,619 and/or U.S. Publication Nos. US-2021-0370877 and/or US-2010-0007463, which are hereby incorporated herein by reference in their entireties) may communicate a signal to the door locking system via a wire connection or the like, or wirelessly, such as via a radio frequency signal or via an infrared signal or via other wireless signaling means. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system.

Optionally, the door handle assembly may include a soft touch handle portion, such as utilizing the principles described in U.S. Pat. Nos. 6,349,450; 6,550,103; and 6,907,643, which are hereby incorporated herein by reference in their entireties. Optionally, the door handle assembly may include an antenna or the like, such as for sensing or transmitting signals, such as described in U.S. Pat. No. 6,977,619, which is hereby incorporated herein by reference in its entirety.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a base portion configured to mount the vehicular exterior door handle assembly at a door of a vehicle;

a handle portion movable relative to the base portion;

wherein the handle portion comprises a grasping portion that defines a discrete movement when the grasping portion pivots relative to the base portion about a pivot axis, and wherein the grasping portion, with the vehicular exterior door handle assembly mounted at the door of the vehicle, is graspable by a user and manually pivotable about the pivot axis to open the door of the vehicle;

wherein the handle portion comprises a slidable portion that defines another discrete movement when the slidable portion slides relative to the base portion;

an electronic sensing device configured to detect discrete movements of the handle portion relative to the base portion;

a control module configured to control unlocking of the door based on the electronic sensing device detecting discrete movements of the handle portion relative to the base portion;

wherein, based on the electronic sensing device detecting an unlocking movement, the control module actuates an electronic switch coupled to a latch mechanism of the door, and wherein the detected unlocking movement comprises two or more discrete movements of the handle portion relative to the base portion; and wherein, with the vehicular exterior door handle assembly mounted at the door of the vehicle and when the electronic switch is actuated, the electronic switch actuates the latch mechanism of the door to unlock the door.

2. The vehicular exterior door handle assembly of claim 1, wherein the two or more discrete movements of the unlocking movement comprise predetermined discrete movements of the handle portion relative to the base portion.

3. The vehicular exterior door handle assembly of claim 2, wherein the unlocking movement is detected based on comparison of (i) two or more discrete movements of the handle portion relative to the base portion detected by the electronic sensing device and (ii) the two or more discrete movements stored in memory.

4. The vehicular exterior door handle assembly of claim 3, wherein the stored two or more discrete movements comprise a sequence of discrete movements of the handle portion relative to the base portion.

5. The vehicular exterior door handle assembly of claim 1, wherein, with the door unlocked, the grasping portion is manually pivotable about the pivot axis by the user relative to the base portion to further actuate the latch mechanism to open the door.

6. The vehicular exterior door handle assembly of claim 1, wherein, when the grasping portion pivots relative to the base portion, the grasping portion also pivots relative to the slidable portion, and wherein, with the vehicular exterior door handle assembly mounted at the door of the vehicle, and when the slidable portion slides relative to the base portion, the slidable portion and the grasping portion move together and in tandem relative to the base portion.

7. The vehicular exterior door handle assembly of claim 1, wherein a button is disposed at an outer surface of the handle portion, and wherein, with the door unlocked, the button is actuatable by a user to further actuate the latch mechanism to open the door.

8. The vehicular exterior door handle assembly of claim 1, wherein a plane of the handle portion is (a) parallel to the pivot axis and (b) parallel to a longitudinal axis of the handle portion, and wherein, with the vehicular exterior door handle assembly mounted at the door of the vehicle, the handle portion is movable relative to the base portion in at least one selected from the group consisting of (i) an axial direction parallel to the plane of the handle portion and (ii) a pivotal direction about an axis perpendicular to the plane of the handle portion.

9. The vehicular exterior door handle assembly of claim 8, wherein a first pin and a second pin are fixedly attached to the base portion, and wherein the handle portion comprises a first slot that receives the first pin and a second slot that receives the second pin, and wherein the handle portion is movable relative to the base portion according to travel of the first pin along the first slot and travel of the second pin along the second slot.

10. The vehicular exterior door handle assembly of claim 9, wherein the first slot comprises an axial slot extending along the longitudinal axis of the handle portion.

11. The vehicular exterior door handle assembly of claim 10, wherein the second slot comprises (i) a first axial portion extending along the longitudinal axis of the handle portion, and (ii) a second axial portion extending perpendicular to the longitudinal axis of the handle portion, and wherein the handle portion is movable relative to the base portion in the axial direction parallel to the plane of the handle portion according to travel of the first pin along the axial slot and travel of the second pin along the first axial portion of the second slot, and wherein the handle portion is pivotable in the pivotal direction about the first pin according to travel of the second pin along the second axial portion of the second slot.

12. The vehicular exterior door handle assembly of claim 1, wherein the control module comprises electronic circuitry that is disposed remote from the vehicular exterior door handle assembly.

13. The vehicular exterior door handle assembly of claim 1, wherein, with the vehicular exterior door handle assembly mounted at the door of the vehicle, and based on determination of presence of a keyfob associated with the vehicle at or near the door of the vehicle, the unlocking movement is detected based on the electronic sensing device detecting a single discrete movement of the handle portion.

14. The vehicular exterior door handle assembly of claim 1, wherein a plane of the handle portion is (i) parallel to the pivot axis and (ii) parallel to a longitudinal axis of the handle portion, and wherein, with the vehicular exterior door handle assembly mounted at the door of the vehicle, the handle portion is movable relative to the base portion in an axial direction parallel to the plane of the handle portion.

15. The vehicular exterior door handle assembly of claim 1, wherein a plane of the handle portion is (i) parallel to the pivot axis and (ii) parallel to a longitudinal axis of the handle portion, and wherein, with the vehicular exterior door handle assembly mounted at the door of the vehicle, the handle portion is movable relative to the base portion in a pivotal direction about an axis perpendicular to the plane of the handle portion.

16. The vehicular exterior door handle assembly of claim 1, wherein the pivot axis of the grasping portion is perpendicular to a cross-vehicle axis of the vehicle.

17. A vehicular exterior door handle assembly, the vehicular exterior door handle assembly comprising:

a base portion configured to mount the vehicular exterior door handle assembly at a door of a vehicle;

a handle portion movable relative to the base portion;

wherein the handle portion comprises a grasping portion that defines a discrete movement when the grasping portion pivots relative to the base portion about a pivot axis, and wherein the grasping portion, with the vehicular exterior door handle assembly mounted at the door of the vehicle, is graspable by a user and manually pivotable about the pivot axis to open the door of the vehicle;

wherein the handle portion comprises a slidable portion that defines another discrete movement when the slidable portion slides relative to the base portion, and wherein, when the grasping portion pivots relative to the base portion, the grasping portion also pivots relative to the slidable portion, and wherein, with the vehicular exterior door handle assembly mounted at the door of the vehicle, the slidable portion and the grasping portion are movable together and in tandem relative to the base portion;

an electronic sensing device configured to detect discrete movements of the handle portion relative to the base portion;

wherein, based on the electronic sensing device detecting an opening movement, an electronic switch coupled to a latch mechanism of the door is actuated, and wherein the detected opening movement comprises two or more predetermined discrete movements of the handle portion relative to the base portion;

wherein a control module comprising electronic circuitry is disposed remote from the vehicular exterior door handle assembly, and wherein, with the vehicular exterior door handle assembly mounted at the door of the vehicle, the control module controls actuation of the electronic switch based on the electronic sensing device detecting the opening movement; and wherein, with the vehicular exterior door handle assembly mounted at the door of the vehicle and when the electronic switch is actuated, the electronic switch actuates the latch mechanism of the door to open the door.

18. The vehicular exterior door handle assembly of claim 17, wherein the opening movement is detected based on comparison of (i) two or more discrete movements of the handle portion relative to the base portion detected by the electronic sensing device and (ii) the two or more discrete movements stored in memory.

19. The vehicular exterior door handle assembly of claim 18, wherein the stored two or more discrete movements comprise a sequence of discrete movements of the handle portion relative to the base portion.

20. The vehicular exterior door handle assembly of claim 17, wherein a plane of the handle portion is (a) parallel to the pivot axis and (b) parallel to a longitudinal axis of the handle portion, and wherein, with the vehicular exterior door handle assembly mounted at the door of the vehicle, the handle portion is movable relative to the base portion in at least one selected from the group consisting of (i) an axial direction parallel to the plane of the handle portion and (ii) a pivotal direction about an axis perpendicular to the plane of the handle portion.

21. The vehicular exterior door handle assembly of claim 20, wherein a first pin and a second pin are fixedly attached to the base portion, and wherein the handle portion comprises a first slot that receives the first pin and a second slot that receives the second pin, and wherein the handle portion is movable relative to the base portion according to travel of the first pin along the first slot and travel of the second pin along the second slot.

22. The vehicular exterior door handle assembly of claim 21, wherein the first slot comprises an axial slot extending along the longitudinal axis of the handle portion.

23. The vehicular exterior door handle assembly of claim 22, wherein the second slot comprises (i) a first axial portion extending along the longitudinal axis of the handle portion, and (ii) a second axial portion extending perpendicular to the longitudinal axis of the handle portion, and wherein the handle portion is movable relative to the base portion in the axial direction parallel to the plane of the handle portion according to travel of the first pin along the axial slot and travel of the second pin along the first axial portion of the second slot, and wherein the handle portion is pivotable in the pivotal direction about the first pin according to travel of the second pin along the second axial portion of the second slot.

24. The vehicular exterior door handle assembly of claim 17, wherein the pivot axis of the grasping portion is perpendicular to a cross-vehicle axis of the vehicle.

* * * * *